United States Patent [19]

West

[11] 4,360,335
[45] Nov. 23, 1982

[54] MOLDING PRESS FOR SEMI-PNEUMATIC TIRE BODIES AND THE LIKE

[75] Inventor: Wilson West, Pulaski, Tenn.

[73] Assignee: Sun Metal Products, Inc., Warsaw, Ind.

[21] Appl. No.: 297,230

[22] Filed: Aug. 28, 1981

[51] Int. Cl.³ ............................................ B29H 5/08
[52] U.S. Cl. .................................. 425/450.1; 425/47;
425/589; 425/406; 425/411; 425/593;
425/451.5
[58] Field of Search ................... 425/17, 19, 21, 22,
425/23, 24, 25, 26, 27, 31, 32, 33, 39, 46, 47,
450.1, 451.5, 451.6, 589, 592, 593, DIG. 222,
DIG. 220, 406, 408, 411

[56] References Cited

U.S. PATENT DOCUMENTS

| | | | |
|---|---|---|---|
| 1,872,158 | 8/1932 | Maynard | 425/450.1 X |
| 1,932,063 | 10/1933 | Brown et al. | 425/47 |
| 2,338,280 | 1/1944 | Brundage | 425/451.5 X |
| 2,350,175 | 5/1944 | Luxenberger | 425/451.5 |
| 2,358,686 | 9/1944 | Caron | 425/593 X |
| 2,716,258 | 8/1955 | Sugg | 425/22 |
| 2,790,478 | 4/1957 | Shapiro | 425/26 X |
| 2,809,396 | 10/1957 | Roesch | 425/47 X |
| 2,904,831 | 9/1959 | Fröhlich | 425/47 |
| 3,015,848 | 1/1962 | Höllfritsch | 425/593 |
| 3,103,701 | 9/1963 | Calchera et al. | 425/592 X |
| 3,241,190 | 3/1966 | Laudisa | 425/47 X |
| 3,245,122 | 4/1966 | Maurer | 425/593 X |
| 3,376,607 | 4/1968 | Brown | 425/593 |
| 3,577,591 | 5/1971 | Richards et al. | 425/47 X |
| 3,990,822 | 11/1976 | MacMillan | 425/25 |

Primary Examiner—J. Howard Flint, Jr.
Attorney, Agent, or Firm—John S. Fosse

[57] ABSTRACT

A molding press comprises a stationary platen or die fixed in a machine frame and a cooperating movable platen or die positionable toward and away from the stationary platen for operation through a molding cycle. Cam slot and follower guide means direct the movable platen through a clamshell movement; and a scissors mechanism is connected between the machine frame and the movable platen with a reversible electric motor providing rotational force to the lead screw of the scissors mechanism.

10 Claims, 4 Drawing Figures

MOLDING PRESS FOR SEMI-PNEUMATIC TIRE BODIES AND THE LIKE

FIELD OF THE INVENTION

This invention relates generally to the art of molded rubber parts, for example solid or semi-pneumatic tire bodies. The invention relates more specifically to molding presses used in making such products.

BACKGROUND OF THE INVENTION

As is well known, rubber molding compositions require both elevated temperatures and elevated pressures in order to achieve vulcanization or cure; and in the past, the elevated pressure for the molding of rubber parts has been ordinarily supplied by electrically energized hydraulic systems. However, these prior art hydraulic presses operate under maximum system pressure with the highest energy consumption when the dies are closed; and that latter condition exists for perhaps 90% of the molding cycle. In addition to being energy-inefficient, hydraulic molding presses are restricted in the pressures that can be delivered for a given operating cycle; and these presses have the additional disadvantage of being incapable of control within narrow limits of pressure and cycle time.

BRIEF DESCRIPTION OF THE INVENTION

The present invention overcomes the major disadvantages of hydraulic molding presses by incorporating a scissors mechanism in a rubber molding press to move the dies and transmit compressive force and by using a small electric motor to drive the lead screw of the scissors mechanism through a complex of intermeshed speed-reducing gears. The resultant press apparatus has proved to be energy-efficient, fast-acting and capable of delivering very high clamping pressure.

Accordingly, a general object of the present invention is to provide a new and improved molding press.

Another object of the invention is to provide a molding press which is considerably less costly to build than a hydraulic press of comparable capacity.

Still another object of the invention is to provide a rubber molding press which has a refined control capability on its cycle pressures and cycle times.

And still another object of the invention is to provide a rubber molding press having extremely low energy consumption.

Yet another object of the invention is to provide a molding press in which the compression forces are balanced and evenly distributed.

Additional objects and features of the invention pertain to the particular structures and arrangements whereby the foregoing objects are attained.

BRIEF DESCRIPTION OF THE DRAWINGS

In order that the principles of the present invention may be readily understood, a single embodiment thereof, applied to a molding press for use in the manufacture of solid and semi-pneumatic tires but to which the application is not to be restricted, is shown in the accompanying drawings wherein.

DETAILED DESCRIPTION OF THE INVENTION

Figure 1:
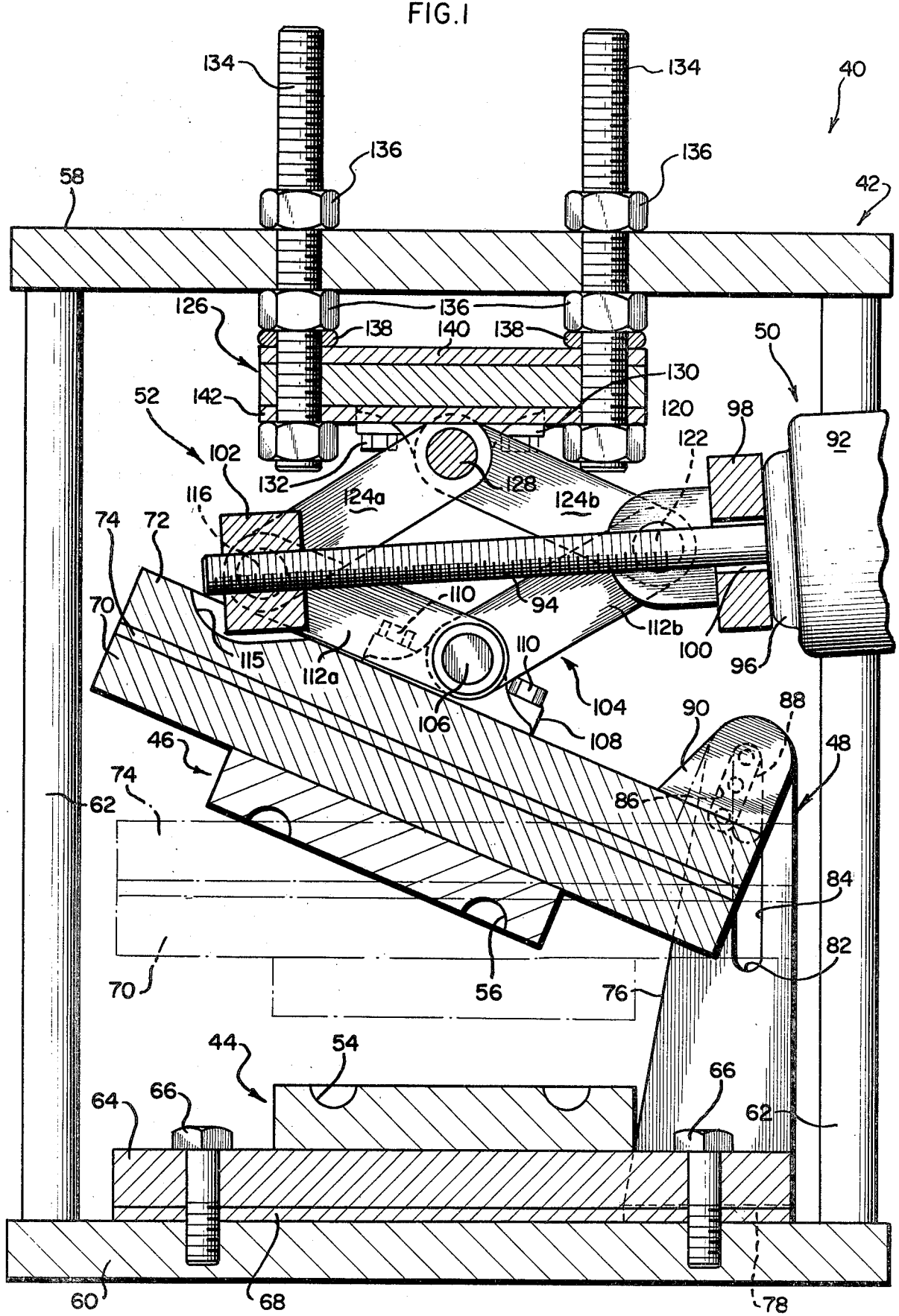
FIG. 1 is a side elevational view of rubber molding press constructed in compliance with the invention, shown in central cross-section and illustrating the die parts fully separated as to admit a charge of molding compound or to permit extrication of a finished part.

Referring now in detail to the drawings and specifically to FIG. 1, a compression molding machine or press indicated generally by the reference numeral 40 broadly comprises a machine frame 42, a stationary platen or lower die 44, a cooperating movable platen or upper die 46, a guide system 48 for directing a clamshell movement of the die 46, a powered drive arrangement 50, and a scissors mechanism 52 for transmitting mechanical forces from the drive arrangement 50 to the movable die 46.

In the illustrated embodiment, the molding press 40 is intended for use in the manufacture of, for example, solid or semi-pneumatic rubber tires to be employed on wheels for such products as lawn seeders, outdoor grills, welding carts and the like. As a consequence, the stationary platen 44 is fashioned with an annular cavity fraction 54 that is configurated in accordance with the geometry of the part to be replicated. Cooperatively, the movable platen 46 is fabricated with a complementary cavity fraction 56 and the platens 44 and 46 are suitably supplied with a heat transfer medium as required. The mold cavity is appropriately arranged to vent gases and accommodate flash.

The machine frame 42 provides mechanical support for the operating components of the molding press 40 and includes a top plate 58 which is spaced above a bed plate 60 to be rigidly secured thereto by four upright corner posts 62. In addition, the machine frame 42 may be bench-mounted or floor-mounted as desired. Furthermore, the bed plate 60 supports stationary platen 44 in permanent location; and the lower platen or die 44 is welded or otherwise suitably fixed to a carrier plate 64 to be fastened to the bed plate 60 by machine screws 66 or other fastening means. Advantageously, a resilient compression pad 68 is interposed between the carrier plate 64 and the bed plate 60. Cooperatively, the movable platen or upper die 46 is welded or otherwise affixed to a carrier plate 70; and the plate 70 is bolted or screwed to a transfer plate 72 with a resilient compression pad 74 situated therebetween.

Figure 4:
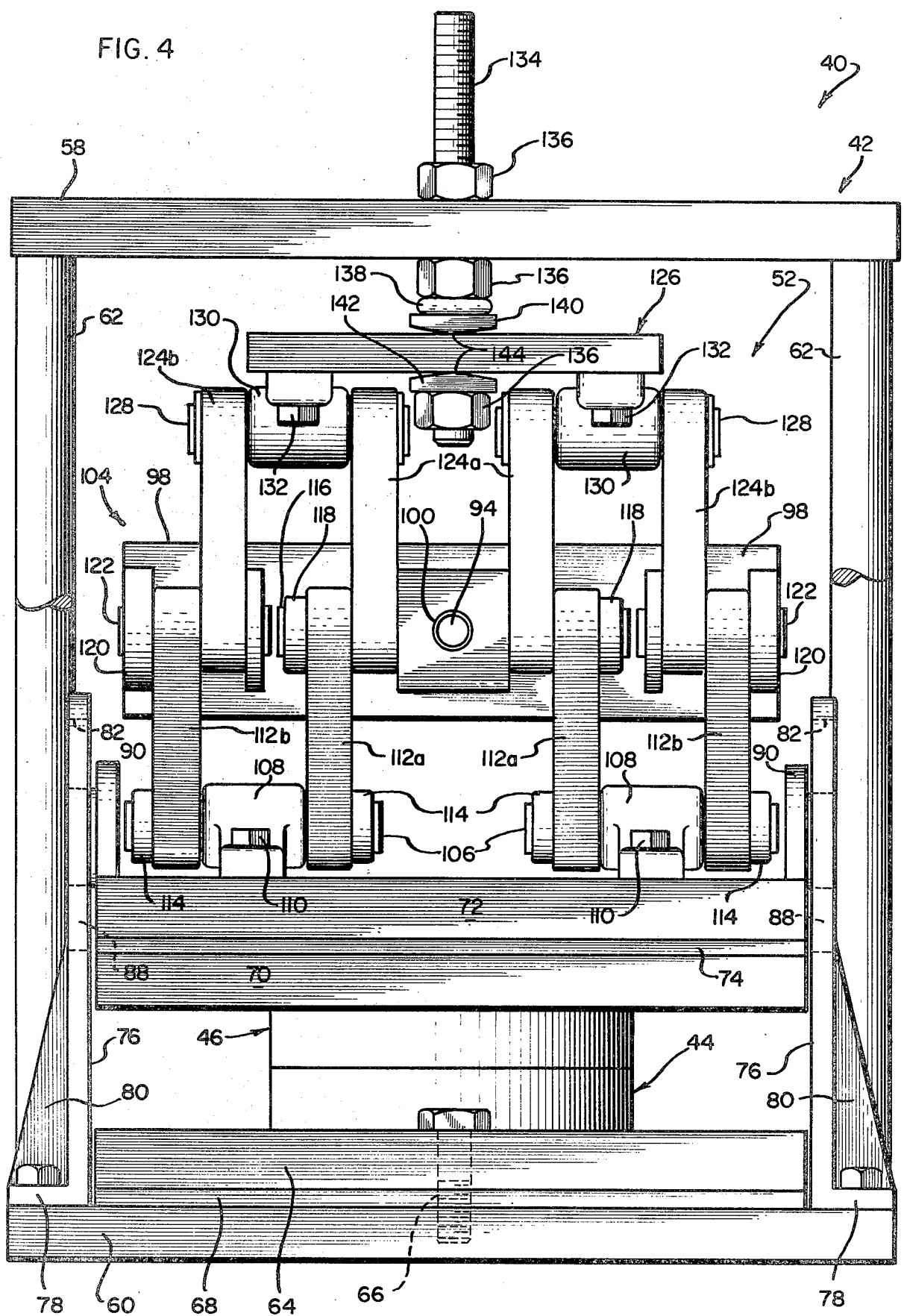
FIG. 4 is a front end elevational view of the apparatus of FIGS. 1–3, taken substantially along the line 4—4 of FIG. 3.

Continuing with reference to FIG. 1 and with additional reference to FIG. 4, the guide system 48 includes a pair of side plates 76 which are spaced apart to admit the movable platen 46 and the transfer plate 72 freely therebetween and which terminate at their lower extremities in foot plates 78 that are bolted to the bed plate 60 of the machine frame. As is shown in FIG. 4, each of the side plates 76 is fabricated with a reinforcing web 80 which stiffens and rigidifies the upright member. Giving particular attention to FIG. 1, each of the side plates 76 is fashioned with a cam slot 82 which comprises a vertical track portion 84 and an upper, offset or angled track portion 86. In order to cooperate with the slots 82 in directing a clamshell type of movement of the upper die 46, elongated cam followers 88 are fastened on the respective outside surfaces of a pair of upstanding ears 90 that are fastened to the transfer plate 72 adjacent the side edges thereof. The followers 88 slide smoothly in the slots 82 to establish the desired pattern of movement of the upper die 46 under the actuation of the powered drive arrangement 50 and the scissors mechanism 52.

The powered drive arrangement 50 comprises a reversible electric motor 92 which rotates a lead screw 94 of the scissors mechanism 52 through a complex of intermeshed speed-reducing gears of a gear reduction unit 96. The motor 92 is cantilevered from the scissors mechanism 52 by affixation to a mounting plate 98 which is fixed in the scissors mechanism and which is centrally apertured to receive a bearing 100, the smooth shaft portion of the lead screw 94 rotating in the bearing 100.

With supplemental reference to FIG. 4, the threaded length of the lead screw 94 of scissors mechanism 52 turns in a cooperatively threaded aperture in a traveling nut 102 to extend and contract a system of pivotally interconnected links 104 defining a scissors jack, nut 102 being fixed in the system 104 against rotation.

The linkage system 104 includes lower, horizontal pivot rods 106 which are secured to the upper, movable platen 46 by means including the transfer plate 72. Specifically, the lower pivot rods 106 are journaled in fixtures 108 that are fastened to the transfer plate 72 by means of bolts 110. The lower pivot rods 106 are also journaled in cooperating pairs of lower links 112 and are held in place by retainer rings 114, rings 114 being secured by set screws or other suitable means. In order to accommodate the traveling nut 102, the transfer plate 72 is recessed with a pocket 115.

As is best shown in FIG. 4, the forward, inboard pair of links 112a are pivotally mounted to the traveling nut 102 by pivot rods 116 held in place by retainer rings 118 using set screws or other fastening means. Cooperatively, the rearward, lower inboard links 112b are pivotally mounted to spaced ears 120 and pivot rods 122, the ears 120 being fastened to the mounting plate 98 and the pivot rods 122 being journaled in the ears by suitable bearings and fastened in place by retainer rings. The scissors mechanism 52 additionally includes paired upper links 124, including upper, rearward, outboard links 124b which are pivotally interconnected to the lower outboard links 112b at the ears 120 and by means of the pivot rods 122, as is best seen in FIG. 4. Similarly, the upper, forward, inboard links 124a are pivotally connected to the traveling nut 102 by the pivot rods 116.

The topmost ends of the upper links 124 are pivotally connected to an adjustably positionable plate 126 by means of pivot rods 128 and brackets 130 which are fastened to the plate 126 by means of bolts or machine screws 132, the pivot rods 128 being suitably journaled in the links 124 and in the brackets 130. The plate 126 is positioned and fixed to the top plate 58 by means of vertical fore and aft bolts 134, cooperatively threaded nuts and locknuts 136, spacer collars 138 disposed as shown, and respective upper and lower rocker bars 140 and 142 fashioned with confronting, longitudinally extending coarse knife edges 144, best seen in FIG. 4, which allow the suspended movable platen and scissors mechanism to balance and seek equilibrium.

Having thus described the illustrated embodiment of the invention, it will be valuable now to set forth the manner in which the component parts cooperate.

Figure 2:
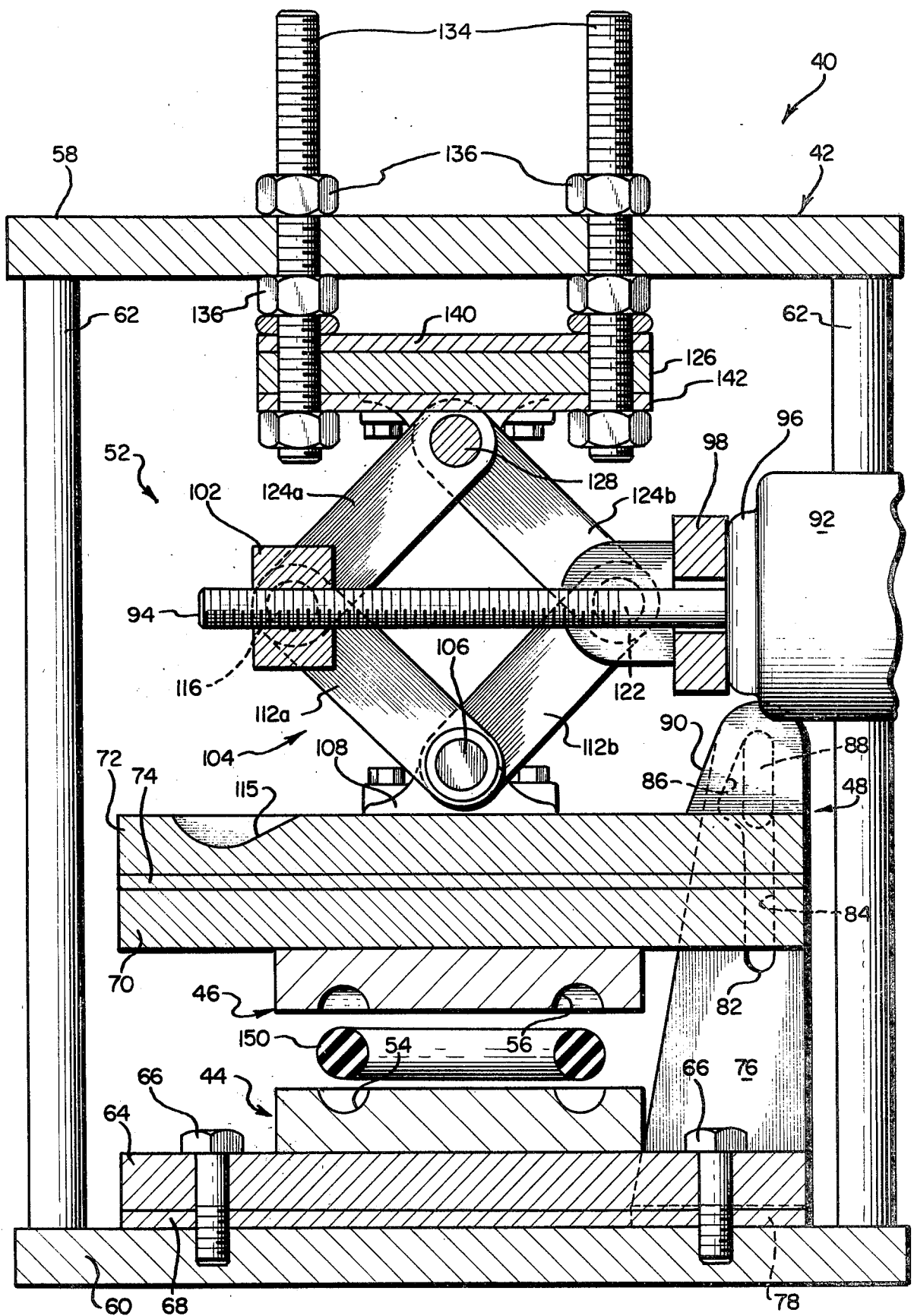
FIG. 2 is a view similar to the showing of FIG. 1 but illustrating the die parts aligned in a partially closed position that is also suggested in broken outline in FIG. 1.
Figure 3:
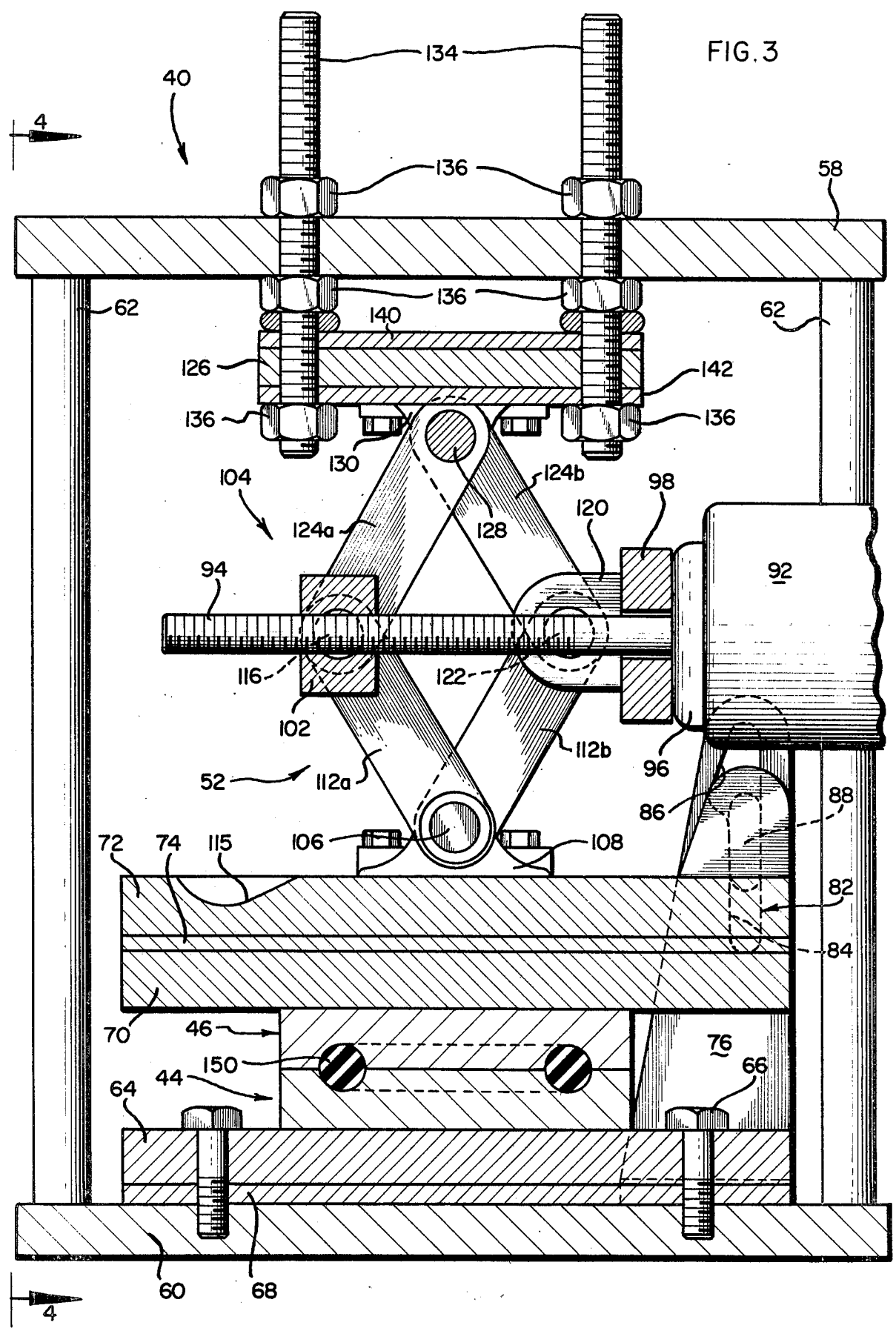
FIG. 3 is a view similar to the showings of FIGS. 1 and 2 but illustrating the die parts in fully closed position with rubber compound filling the mold cavity.

With the press machine 40 generally configured as illustrated in FIG. 1, the dies 44 and 46 being fully separated, a tire preform 150 of raw or unvulcanized rubber molding composition, preheated if required, will be inserted between the dies as is suggested in FIG. 2; and the motor 92 will then be operated to turn the lead screw 94 in a direction for converging the traveling nut 102 and the mounting plate 98. The first action, in response, will be for the cam followers 88 to rotate generally out of their inclined position and about their upper ends and ultimately out of alignment with the angled track portions 86 and into alignment with the vertical track portions 84 of cam slots 82. Alignment of the upper and lower dies 46 and 44, as generally illustrated in FIG. 2, will result. Thereafter, further turning of the lead screw 94 will cause the dies to close as directed by the cam followers 88 traversing the vertical track portions 84 of the cam slots 82 in a generally downward direction. The dies 44 and 46 will thus be closed, as is shown in FIG. 3, and molding pressure will be applied to the preform 150. Heat will be applied in continuation of the compression forces on the dies 44 and 46 until the preform 150 has been cured into a finished part.

It is important to point out that the drive motor 92 only operates when the press is opening and closing, the scissors mechanism and the frictional forces between the lead screw and the traveling nut 102 cooperating to secure the press in closed condition during the long portion of the molding cycle in which the dies are closed. Consequently, the molding press of the present invention may employ a small, energy-efficient motor on the order of ½ horsepower whereas a comparable hydraulic press would require a motor of from about 10 to about 40 horsepower to accomplish the same production operation. Moreover, the molding press of the present invention is considerably less costly to construct than a hydraulic press of the same capacity. In addition, the scissors press of the present invention possesses very fine control capability on cycle pressures and times while a comparable hydraulic press is seriously limited in such areas.

In order to open the press to discharge the finished rubber part, the direction of rotation of motor 92 will be reversed to rotate the lead screw 94 in the opposite rotational direction to advance the traveling nut 102 along the lead screw from the position shown in FIG. 3 to the position shown in FIG. 2. During this portion of the cycle, the cam followers 88 rise in the vertical track portions 84 of the cam slots until they top out, whereupon further rotation of the lead screw and reaction of the traveling nut causes the transverse plate 72 to execute an upward arcuate movement generally from the position shown in FIG. 2 to that shown in FIG. 1, the cam followers 88 likewise rotating in the angled track portions 86 of the cam slots 82. This clamshell type of opening allows easy access to the space between upper die 46 and lower die 44 for extraction of the finished part and insertion of a fresh molding preform. The entire cycle will be thereafter repeated.

The specific embodiment herein shown and described is to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. A molding press comprising: a machine frame; a stationary platen secured to said machine frame; a movable platen positionable toward and away from said stationary platen for operation through a molding cycle; guide means for directing the path of movement of said movable platen; power providing means; and a scissors mechanism, including a rotatable lead screw connected to said power providing means, a system of pivotally interconnected links fastened to said movable platen and to said machine frame, and a nut fixed in said linkage system and threadedly mounted on said lead screw.

2. A molding press according to claim 1 wherein said guide means includes cam slot means secured to said machine frame and cam follower means fixed to said movable platen and operable in said cam slot means.

3. A molding press according to claim 2 wherein said cam slot means includes substantially vertical track portion means proximal to said fixed platen and angled track portion means distal from said fixed platen, for directing said movable platen through a clamshell movement upon opening and closing the press.

4. A molding press according to claim 1 wherein said stationary platen and said movable platen are disposed in respective lower and upper positions relative to each other.

5. A molding press according to claim 1 wherein said power providing means includes a reversible drive motor and a speed-reducing gear unit connected between said motor and said lead screw.

6. A molding press according to claim 1 wherein said system of links includes means defining a central vertical axis through said machine frame and wherein said system of links includes paired links inboard and outboard of said axis whereby to distribute the compression forces of molding.

7. A molding press according to claim 6 wherein said paired links include fore and aft paired lower links connected to said movable platen and fore and aft paired upper links connected to said machine frame.

8. A molding press according to claim 1 which further comprises spaced rocker bars connected between said scissors mechanism and said machine frame, said bars having confronting coarse knife edges defining a central plane across which molding forces seek equilibrium.

9. A molding press according to claim 8 wherein said system of links includes paired links disposed in equal number on the opposite sides of said plane whereby to distribute the compression forces of molding.

10. A molding press according to claim 9 wherein said paired links include fore and aft paired lower links connected to said movable platen and fore and aft paired upper links connected to said machine frame by means including said rocker bars.

* * * * *